US007110137B2

(12) United States Patent
Burgess et al.

(10) Patent No.: US 7,110,137 B2
(45) Date of Patent: Sep. 19, 2006

(54) MIXED RASTER CONTENT FILES

(75) Inventors: Henry W. Burgess, Woodinville, WA (US); Ming Liu, Bellevue, WA (US); Raman Narayanan, Kirkland, WA (US); Radoslav Nickolov, Bellevue, WA (US); Wei Zhu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 989 days.

(21) Appl. No.: 10/134,636

(22) Filed: Apr. 30, 2002

(65) Prior Publication Data

US 2003/0202212 A1 Oct. 30, 2003

(51) Int. Cl.
*H04N 1/387* (2006.01)
*G06F 15/02* (2006.01)
*G06F 15/00* (2006.01)

(52) U.S. Cl. .................... 358/1.18; 358/450; 358/1.11; 358/1.9

(58) Field of Classification Search ................ 358/1.9, 358/1.11, 1.17, 1.18, 450; 382/173, 176, 382/239
See application file for complete search history.

(56) References Cited

U.S. PATENT DOCUMENTS 5,778,092 A * 7/1998 MacLeod et al. ........... 382/176
6,701,012 B1 * 3/2004 Matthews ................... 382/173
2002/0076103 A1 * 6/2002 Lin et al. .................... 382/173
2003/0123729 A1 * 7/2003 Mukherjee et al. ......... 382/176
2003/0133617 A1 * 7/2003 Mukherjee .................. 382/239

OTHER PUBLICATIONS

L. Bottou et al., "Efficient Conversion of Digital Documents to Multilayer Raster Formats", IEEE, pp. 444-448, 2001.
P. Haffner et al., "A General Segmentation Scheme for DjVu Document Compression", pp. 17-35, 2002.
L. Bottou et al., "High quality document image comprssion with "DjVu"", Journal of Electronic Imaging, vol. 7(3), pp. 410-424, Jul. 1998.
"ITU-T Recommendation T.44- Mixed raster content (MRC)", ITU-T Recommendation T.44, pp. 1-31, Apr. 1999.
A. Mikheev et al., "Electronic Document Publishing Using DjVu", DAS 2002, LNCS 2423, pp. 480-490, 2002.
TIFF Revision 6.0 Final—Jun. 3, 1992, Adobe Developers Association, pp. 1-41.
European Search Report.

* cited by examiner

*Primary Examiner*—Kimberly Williams
*Assistant Examiner*—Charlotte M. Baker
(74) *Attorney, Agent, or Firm*—Banner & Witcoff, Ltd.

(57) ABSTRACT

A system and process for generating and using mixed raster content files is described. MRC files may be created directly from an application, rather than being processed from a composite image, to separate a single image into background, foreground, and selection masks for each page. Also, an improved MRC structure is described in which only relevant portions are contained in background, foreground, and selection layers for each page.

14 Claims, 17 Drawing Sheets

MIXED RASTER CONTENT FILES

FIELD OF THE INVENTION

Aspects of the present invention are directed to generating and using files. More particularly, the present invention relates to generating and using mixed raster content files.

BACKGROUND

The use of non-modifiable files has increased with the growth of the internet. One standard file format for publishing documents is the Adobe Acrobat file format (generally associated with the extension .PDF). Other file formats include JPEG and bitmap files. A benefit of these files is that one can use these file formats to exchange information on the internet with minimal concern for modification of the documents.

Another file format that is commonly used is the MRC or mixed raster content file. This file format separates an image into three equally sized images and stores them at different resolutions and, in some cases, with different compression rates or technologies. FIG. 2 shows a typical process for generation of MRC files. An image generator 301 outputs a source image 302. Source image 302 has an image resolution of 300 dpi. The source image 302 is separated by a separation process 303 into three separate images 304–306. The three separate images include a black/white (B/W) mask image 304, a foreground image 305, and a background image 306. The three images 304–306 have the same dimensions (x,y) as the source image 302. As shown in FIG. 2, the resolutions of the three images 304–306 are shown as 300 dpi, 300 dpi, and 100 dpi, respectively. The three images may be selectively compressed by compression process 307 to various degrees by different compression technologies.

Despite the benefits of being able to decompose a source image 302 into various other files 304–306, MRC files suffer from a long decomposition process (separation process 303), as is known in the art. The separation process 303 attempts to analyze all components of an image and separate out aspects for inclusion in each of the files 304–306. A need exists to generate MRC files without the long delay.

Also, the composite files 304–306 may be large while having little content. FIG. 3 shows a sample conventional MRC file. The file includes three layers including background layer 401, selector layer or black/white or B/W mask layer 402, and foreground layer 403. For purposes of illustration, the composite image 411 is shown as the resultant image when the three layers (401–403) are combined. As is known in the art, background layer has a color depth per pixel of 24 bits per pixel (24 bpp), selector layer has a color depth per pixel of 1 bpp, and foreground layer has a color depth of 24 bpp.

Each layer comprises one image. Each image has the same dimensions (x,y) (as shown in FIGS. 2 and 3). For example, background layer 401 includes one image with content 404 in the center. Selector layer 402 includes one image with three sets of content 405–407. The content 405 is "Black Text," which is intended to represent black text. Content 406 is "Color Text A," which is text that has color A in composite image 411, yet is represented in selector layer 402 as black text. This is because selector layer 402 only has a 1 bpp color depth. Similarly, content 407 is "Color Text B," which is text that has color B in composite image 411, yet is black text in selector layer 402. Foreground layer 403 includes three sets of color palettes including black 408, color A 409, and color B 410. A concern with the MRC file of FIG. 3 is the significant amount of unused space. The unused space increases the underlying image size of each layer. This unused space increases time needed for encoding, decoding, and composition stages. Also, the combination of unused space with content sometimes results in poor compression of the layers. Accordingly, a need exists to minimize unused space in the composite files 304–306.

SUMMARY

Aspects of the present invention are directed to the generation and use of MRC files to address one or more of the needs described above. In some aspects, MRC files are generated by print drivers without having to be processed by a separation process. In other embodiments, each layer of MRC files may include one or more images (or sub-images) to permit compression that is more efficient than a single image that covers each layer. These various aspects may be used separately or in combination.

These and other features of the invention will be apparent upon consideration of the following detailed description of various embodiments.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION

The following description is directed to mixed raster content files. It is appreciated that the disclosed concepts and approaches may be applied to other file types. Also, various processes are disclosed. These processes are provided as examples that may be used and are not considered the only expressions of the various processes used to generate or use the improved mixed raster content files. Further, the pixel colors of the selector layer are generally referred to as black and white. It is appreciated that the selector layer may only have a 1 bit per pixel color depth and therefore may only have pixels as on or off (or color state 1 and color state 0). Black and white are used to simplify the nomenclature.

However, any colors could be used in their place (e.g., fuchsia and cyan) or "on and off" and the like.

Figure 1:
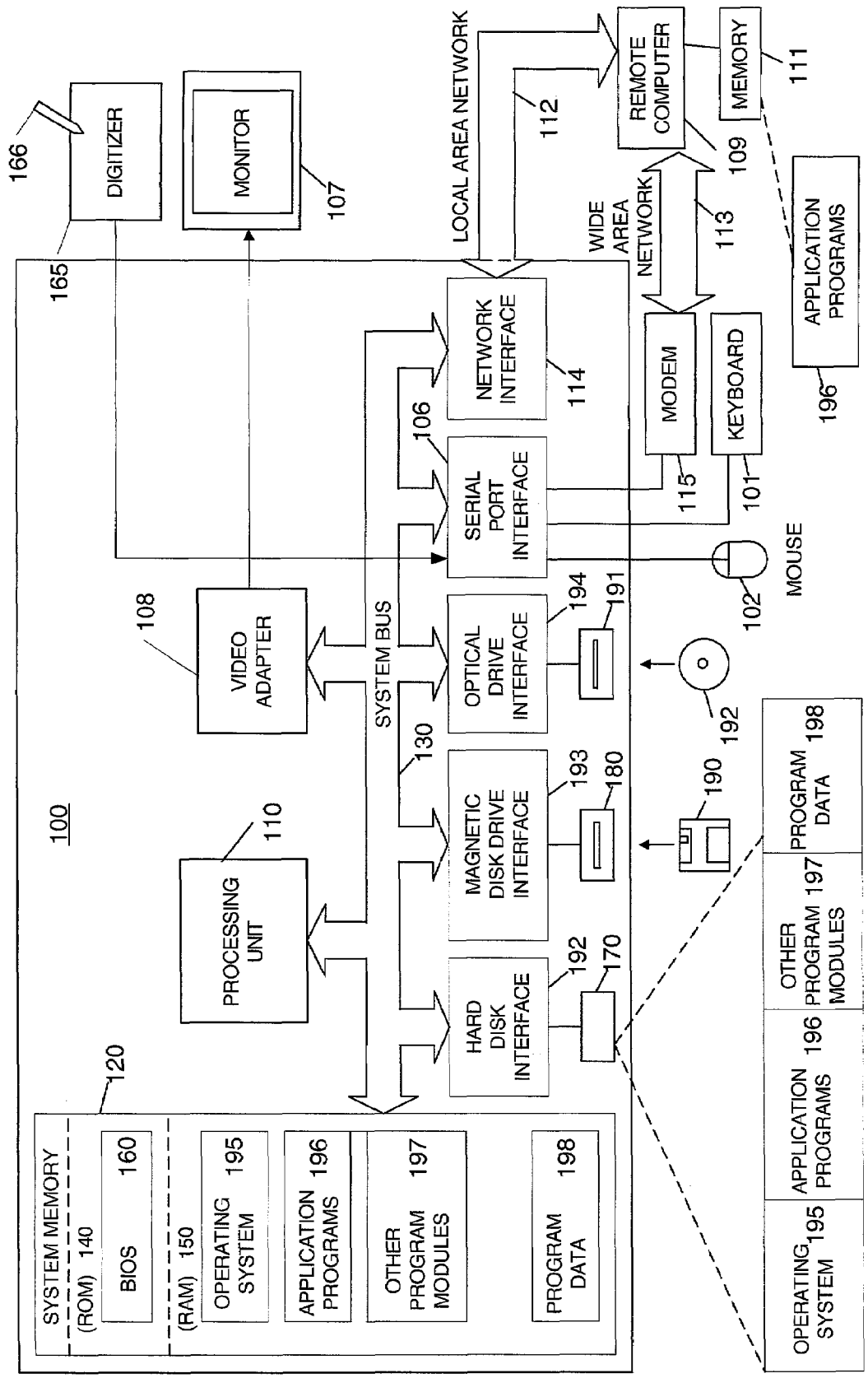
FIG. 1 is a schematic diagram of a general-purpose digital computing environment that can be used to implement various aspects of the invention.

FIG. 1 illustrates a schematic diagram of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In some embodiments, a pen digitizer 165 and accompanying pen or stylus 166 are provided in order to digitally capture freehand input. Although a connection between the pen digitizer 165 and the serial interface port 106 is shown, in practice, the pen digitizer 165 may be coupled to the processing unit 110 directly, via a parallel port or other interface and the system bus 130 as known in the art. Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
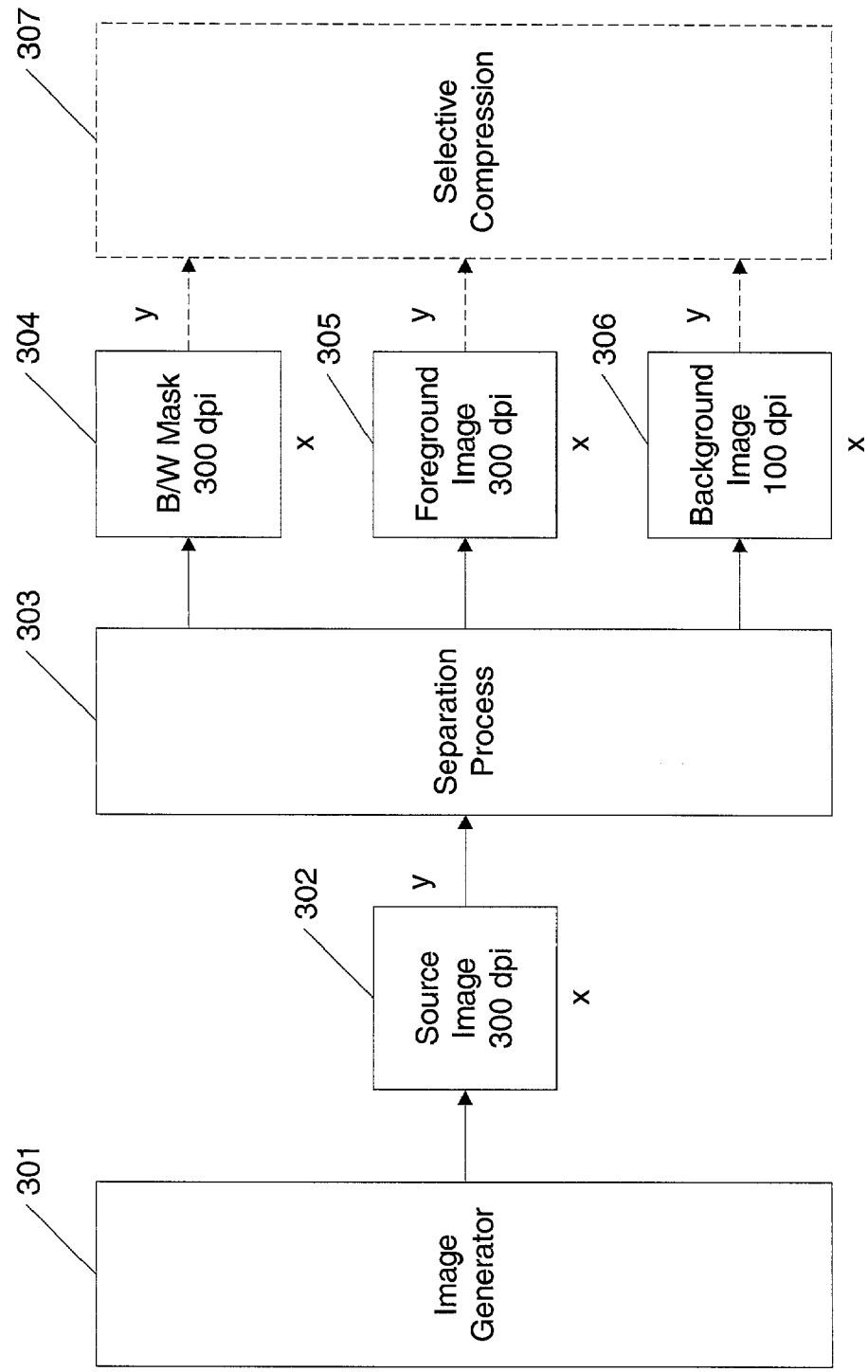
FIG. 2 shows a conventional process for creating a mixed raster content file.
Figure 3:
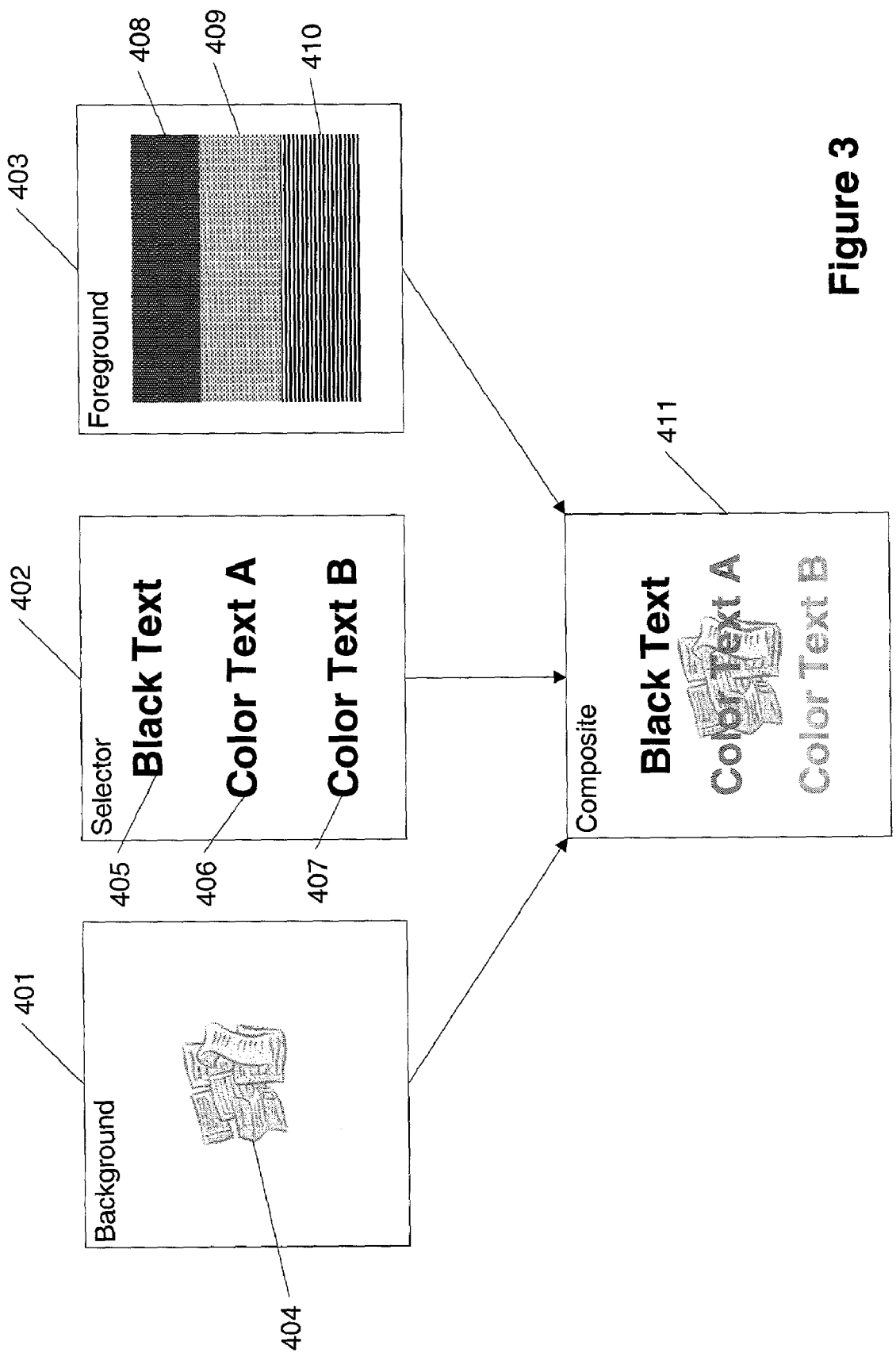
FIG. 3 shows a conventional mixed raster content file.
Figure 4:
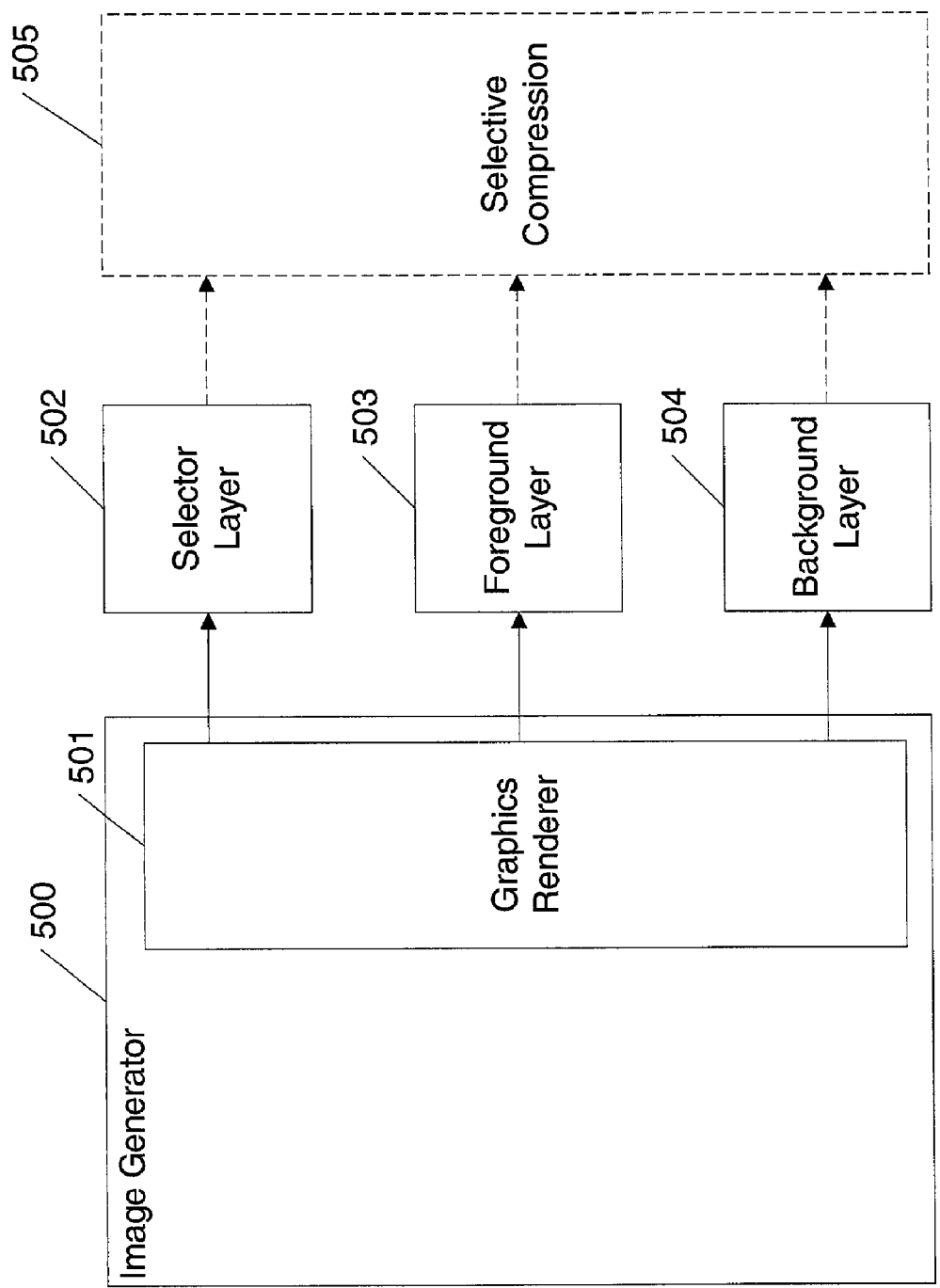
FIG. 4 shows a process for creating a mixed raster content file in accordance with aspects of the invention.

FIG. 4 shows a process for creating a mixed raster content file in accordance with aspects of the invention. An image generator 500 (for example, a painting program, word processing program, a web publishing system, and the like) outputs the content of the MRC file (the three layers: selector layer 502, foreground layer 503, and background layer 504) without outputting a composite image that needs to be converted (i.e., separated) via process 303 of FIG. 2. This output may include calls to a graphics rendering engine 501 (for example, the GDI API available from Microsoft Corporation of Redmond, Wash.). Other graphics renderers 501 may be used as well. Alternatively, the rendering may take place completely within the image generator 500. Finally, the MRC file may optionally be compressed by the selective compression engine 505. The compression is optional as is shown by a broken box.

Figure 5:
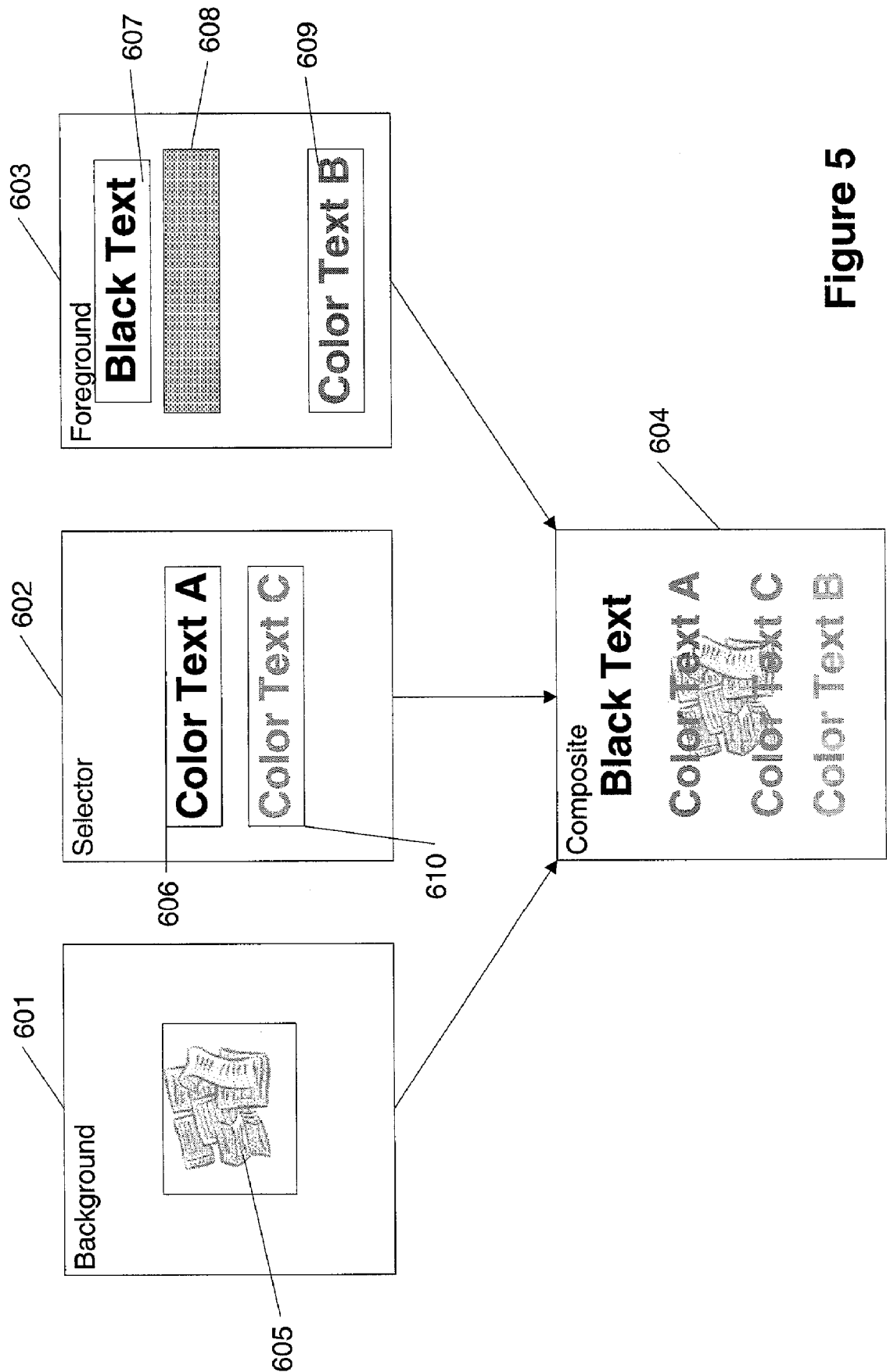
FIG. 5 shows an example of a mixed raster content file in accordance with aspects of the present invention.

FIG. 5 shows an example of a mixed raster content file in accordance with aspects of the present invention. The MRC file includes three layers: background layer 601, selector layer 602, and foreground layer 603. Composite image 604 is shown for explanatory purposes. The background layer includes content 605. The background content 605 may be represented by an image the size of the composite image 604. Alternatively, the background content may be represented by an image having a bounding rectangle smaller than the size of the composite image 604. Selector layer 602 includes content 606 represented by "color text A," which while represented by text having font color A, selector layer 602 represents the content 606 as black text. Also, selector layer 602 includes content 610 represented by "color text C" which while represented by text having font color C, selector layer 602 represents the content 610 as black text. The content 606 and 610 ma be represented as a single image. Alternatively, the content 606 and 610 may be represented by two images (or sub-images). Foreground layer 603 includes black text 607, a colored rectangle 608 in color A, and content 609 as "color text B" in font color B. The colored rectangle 608 may be eliminated in a number of instances, for example, if the text has a uniform color and may be represented by the combination of the selection and background layers. The content 607–609 may be represented as a single image the size of composite image 604 (similar to the identical size descriptions above). Alternatively, the content 607–609 may be represented by two or more images (or sub-images). The images may be defined by bounding areas (rectangles or other shapes as known in the art) as represented by the bounding areas surrounding each of content 607–609.

As shown in FIG. 5, the selection layer 602 is used when a foreground image overlaps a background image. Here, pushing content to the foreground layer from the selection layer makes the rendering task faster, as there is no need to check and perform selecting or alpha blending when there is no overlapping of foreground and background content. Another aspect is that uniform color text and certain line drawings may be stored as binary images in the foreground layer with an appropriate color palette, instead of being stored as a binary image in the selector layer plus a color image in the foreground layer. It is believed that pushing content out of the selector layer into the foreground layer will improve compression and rendering performance.

Another combination is shown in FIG. 5 in which the selection and background layers are present with no foreground layer. In this case, when there is a non-white pixel in the selection layer but no corresponding pixel in foreground layer, the color of the pixel on the composite image is that of the selection layer. This combination is common and can be more efficient in rendering performance and compression than the background, selection, and foreground layer combination.

A foreground layer may have a high color depth (for example, 24 bpp). In one embodiment, all images in the foreground layer have the same color depth. Alternatively, the images in the foreground layer may have one or more color depths. For example, content 607 may have a color depth of 1 bpp, while content 608 and 609 have a different color depth of 24 bpp. Situations exist where the actual color to be associated with a region may be definable based on less than a high color depth. So, in yet a further embodiment, content 608 may have a color depth of 8 bpp while content 609 may have a color depth of something other than 1 bpp and 8 bpp (including but not limited to 2 bpp, 4 bpp, 16 bpp, 24 bpp, 32 bpp, and the like). Using color depth to the extent necessary to define a color range (rather than preset for an entire layer) permits greater and/or more efficient compression by eliminating unneeded color specifying bits per pixel and/or faster compression and rendering performance.

The ability to define color depths based on each image or collection of images in a layer is applicable to the background layer as well.

Figure 6:
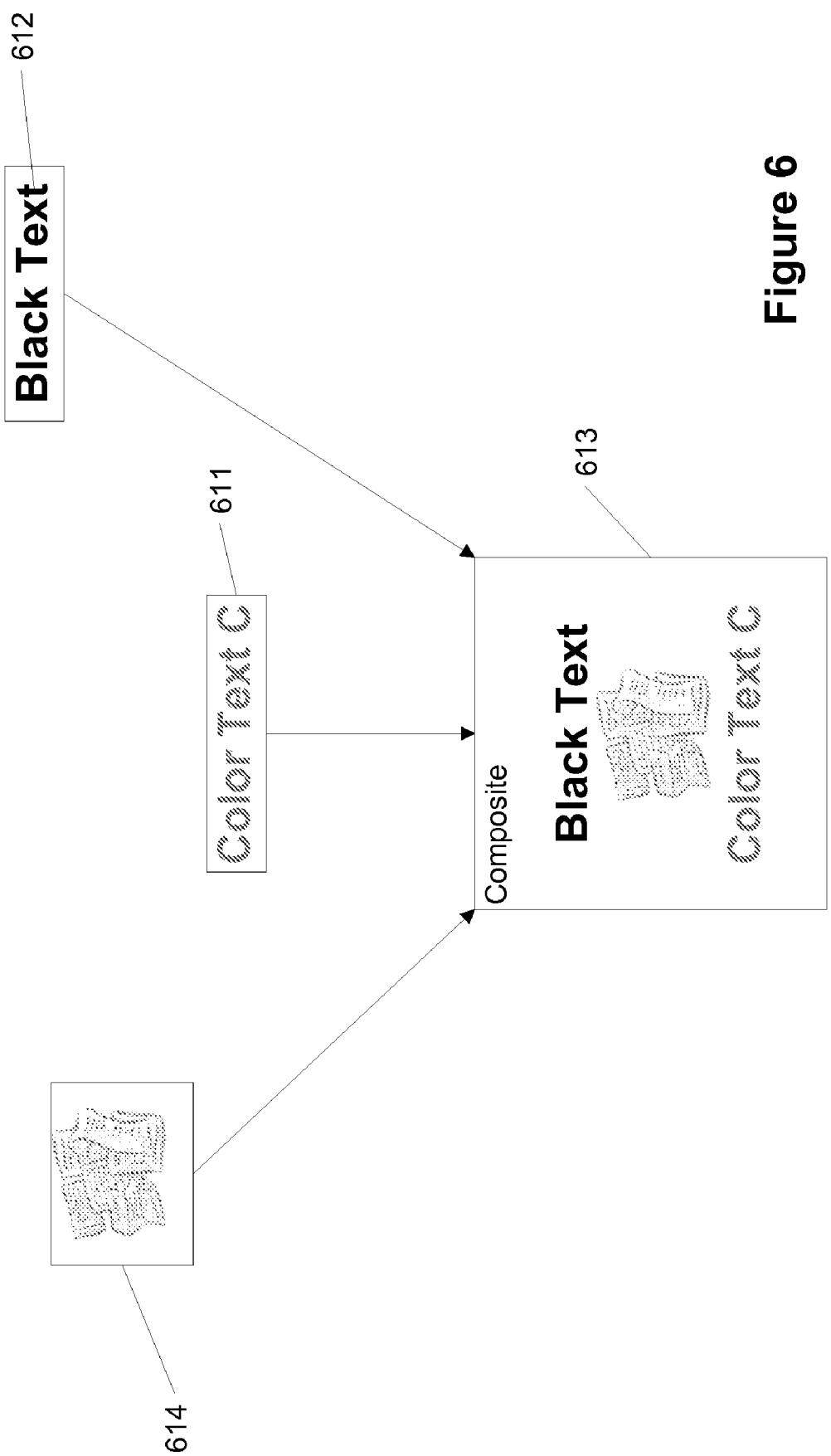
FIG. 6 shows another example of a mixed raster content file in accordance with aspects of the present invention.

FIG. 6 shows another representation of an MRC file. Here, background image 614 is combined with "color text C" 611 and "black text" 612 to form a composite image 613. Each image 614, 611, and 612 has a size smaller than the size of composite image. In this alternative example, the combined sum of images 610, 611, and 614 is smaller than the size of the composite image.

Figure 7A:
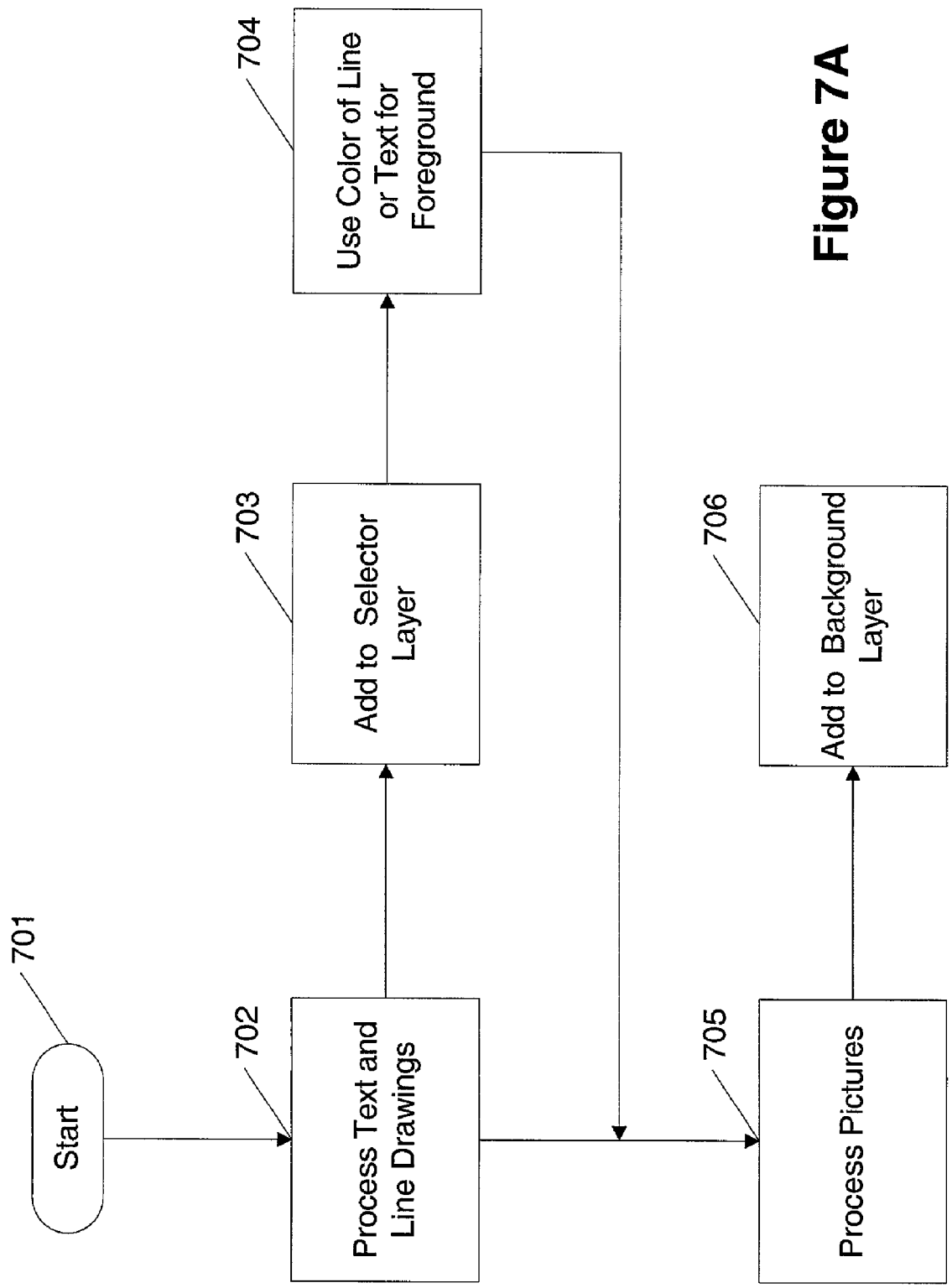
FIGS. 7A and 7B show various processes for creating mixed raster content files in accordance with aspects of the present invention.

FIG. 7A shows an exemplary process for creating a mixed raster content file in accordance with aspects of the present invention. The process starts in step 701 from the image generating application. First, text and line drawings are processed in step 702. If text and/or line drawings are present, they are added to the selector layer in step 703. The color of the line or text is used to create a color area for the foreground layer in step 704. The color area may be rectangular or any other shapes as needed to define the area in the foreground layer to properly specify the color of the text and/or lines from step 702. Next, the pictures resident in the image file are processed in step 705 and added to the background layer in step 706.

The example of FIG. 7A shows the ability to process images directly from an application, as having been sent to a device driver, or from a spooled metafile. In contrast, the conventional approach to generating the MRC file is to take an intact composite image and separate it into various components via separation process 303. The separation process 303 is error prone and consumes significant resources to handle the image decomposition process. The example of FIG. 7A, however, provides the ability to generate MRC files without the separation process as the example of FIG. 7A handles the various components of an image while the various components are still separately addressable.

Figure 7B:
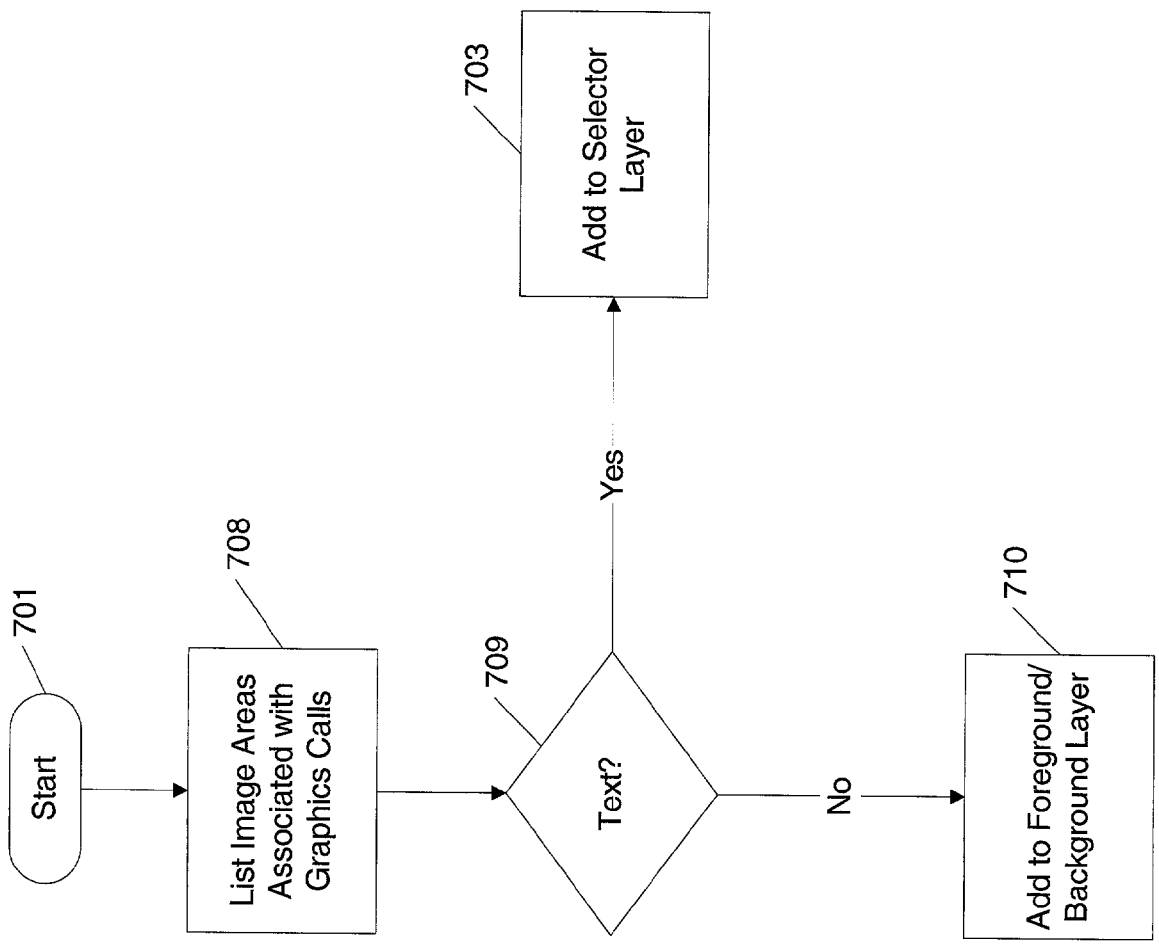

FIG. 7B shows an alternative process for creating an MRC file. Here, when a graphics renderer starts the MRC generation process in step 701, the graphics calls are listed with the relevant image areas in step 708. The list may include one or more of the following for each image area:

Bounding area;

Type of graphics output; and

Color used.

Next, in step 709, if the image area is text or line drawings, then the image area is added to the selector layer in step 703. Otherwise, in step 710, the image area is added to the foreground/background layer. Any type of image is added to the foreground/background layer, making the foreground/background layer a good representation of the document.

Figure 8B:
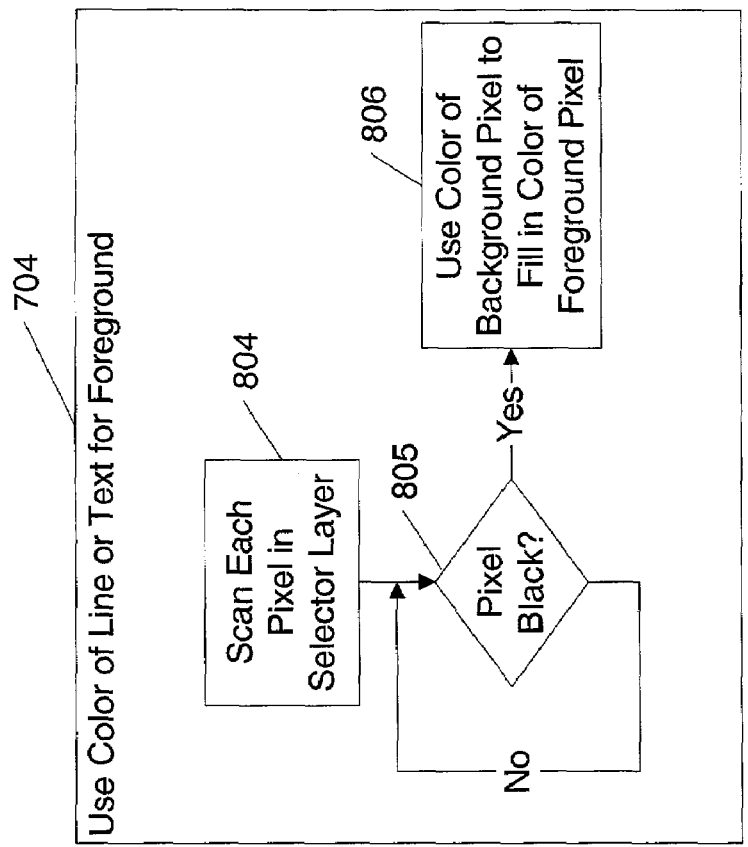
FIGS. 8A and 8B show alternative process steps for FIG. 7A.
Figure 8A:
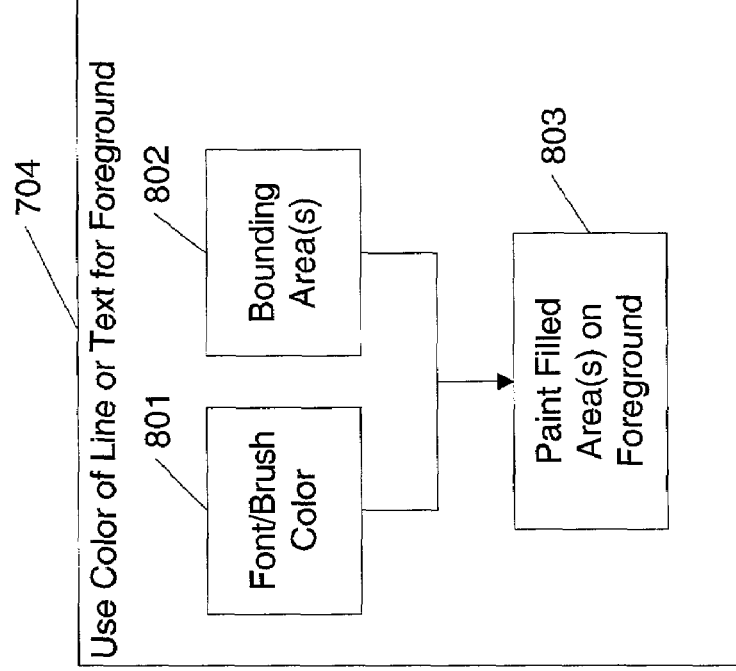

FIGS. 8A and 8B show various options for step 704 of FIG. 7A. In FIG. 8A, the font or brush color of text and lines, respectively, are noted in step 801 and passed to step 803. Also, in step 802, the bounding area or areas (which may be rectangles or other shapes that define the boundaries of the text and or lines) are determined and passed to step 803. Steps 801 and 802 may occur in any order or may be handled concurrently. It is further appreciated that the areas determined in step 802 do not have to be completely filled. For example, a line drawing of a circle may have a bounding area in the shape of a torus. In step 803, the area or areas determined by step 802 are painted as filled areas on the foreground layer.

FIG. 8B shows another alternative for step 704. First, each pixel in the selection layer 804 is scanned. If the pixel is black as determined in step 805, then the color of the background pixel is used to fill in the color of a corresponding foreground pixel in step 806. The scanning step 804 may cover each pixel of the entire selector layer.

Alternatively, as the selector layer may be broken into images that contain content, step 804 may only scan the images in the selector layer. As the area of the selector layer not consumed by images would not contain content, these areas would not be scanned by step 804.

Figure 9A:
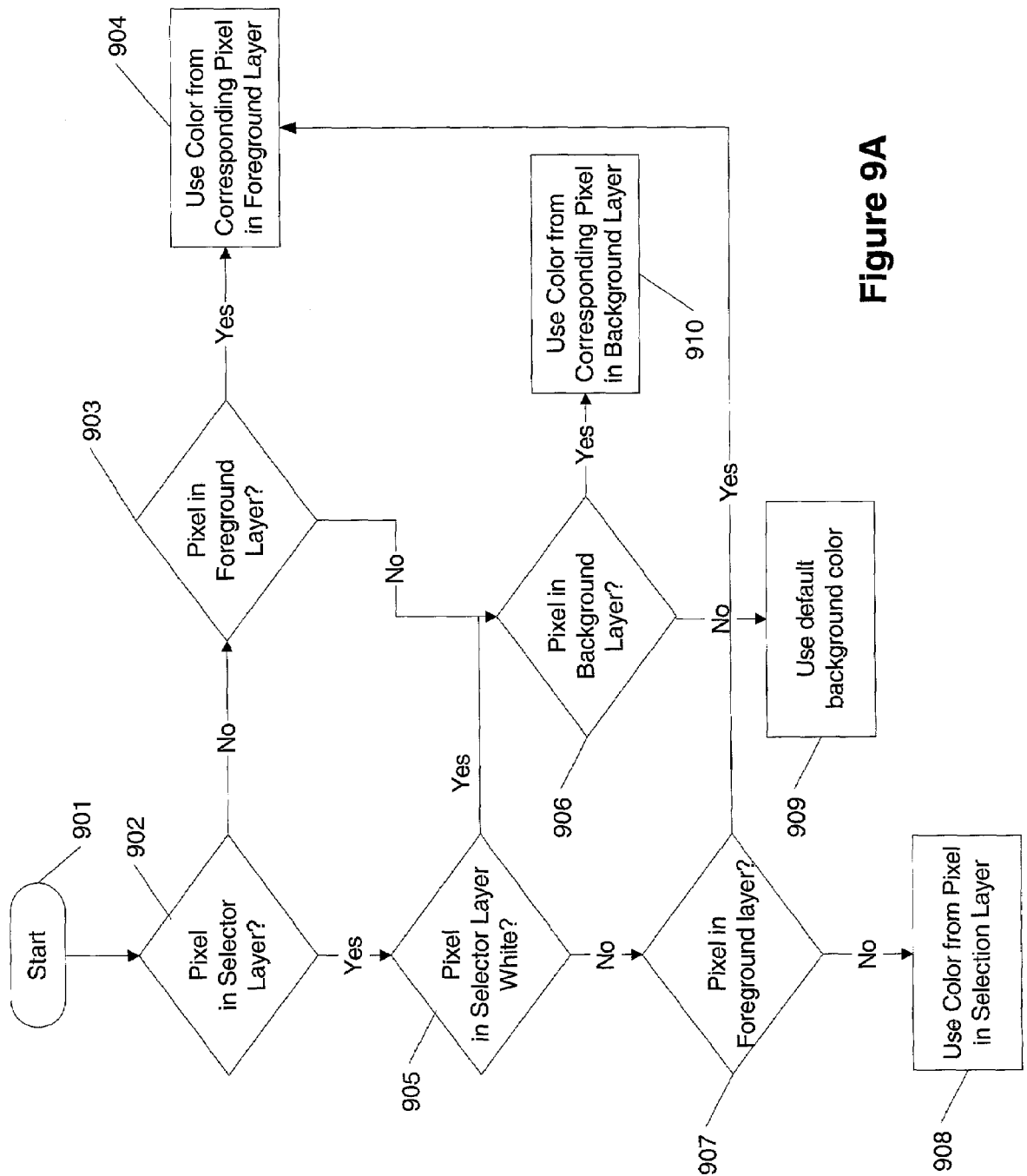
FIGS. 9A and 9B show various processes of rendering a composite image from a mixed raster content file in accordance with aspects of the present invention.

In another aspect of the invention, the arrangement of the MRC file is modified. FIG. 9A shows an exemplary process of rendering a composite image from a mixed raster content file of FIG. 6. In step 901, the system begins to construct a composite image from the various MRC layers. For all pixels in the composite image, it is determined if a pixel is in a selector layer in step 902. If yes, then the system determines if the pixel in the selector layer is white in step 905. If the pixel is white, then the system checks whether there is a pixel in the background layer in step 906. If there is no pixel in the background layer, then the default background color is used in step 909, otherwise the color from the corresponding pixel from the background layer is used in step 910.

If the pixel in the selector layer is not white from step 905, then the system checks whether there is a pixel in the foreground layer in step 907. If there is no pixel in the foreground layer, then the color of the pixel in the selection layer is used in step 908. If there is a pixel in the foreground layer in step 907, then the color from the corresponding pixel in the foreground layer is used in step 904.

If there is no pixel in the selector layer from step 902, then the system determines whether there is a pixel in the foreground layer in step 903. If there is a pixel in the foreground layer, then the system uses the color from the corresponding pixel in the foreground layer in step 904. Otherwise, the system determines whether there is a pixel in the background layer in step 906 and proceeds as described above.

If there was no pixel in the selector layer as determined in step 902, then the system determines if there is a corresponding pixel in the foreground layer in step 903. If no, then the color from the corresponding pixel in the background layer is used (step 906). If there is no corresponding pixel in the background image, then a default pixel color may be used (for example, white or gray or even be designated as transparent). If the outcome of step 903 is yes, then the color from the corresponding pixel in the foreground layer is used (step 904).

Figure 9B:
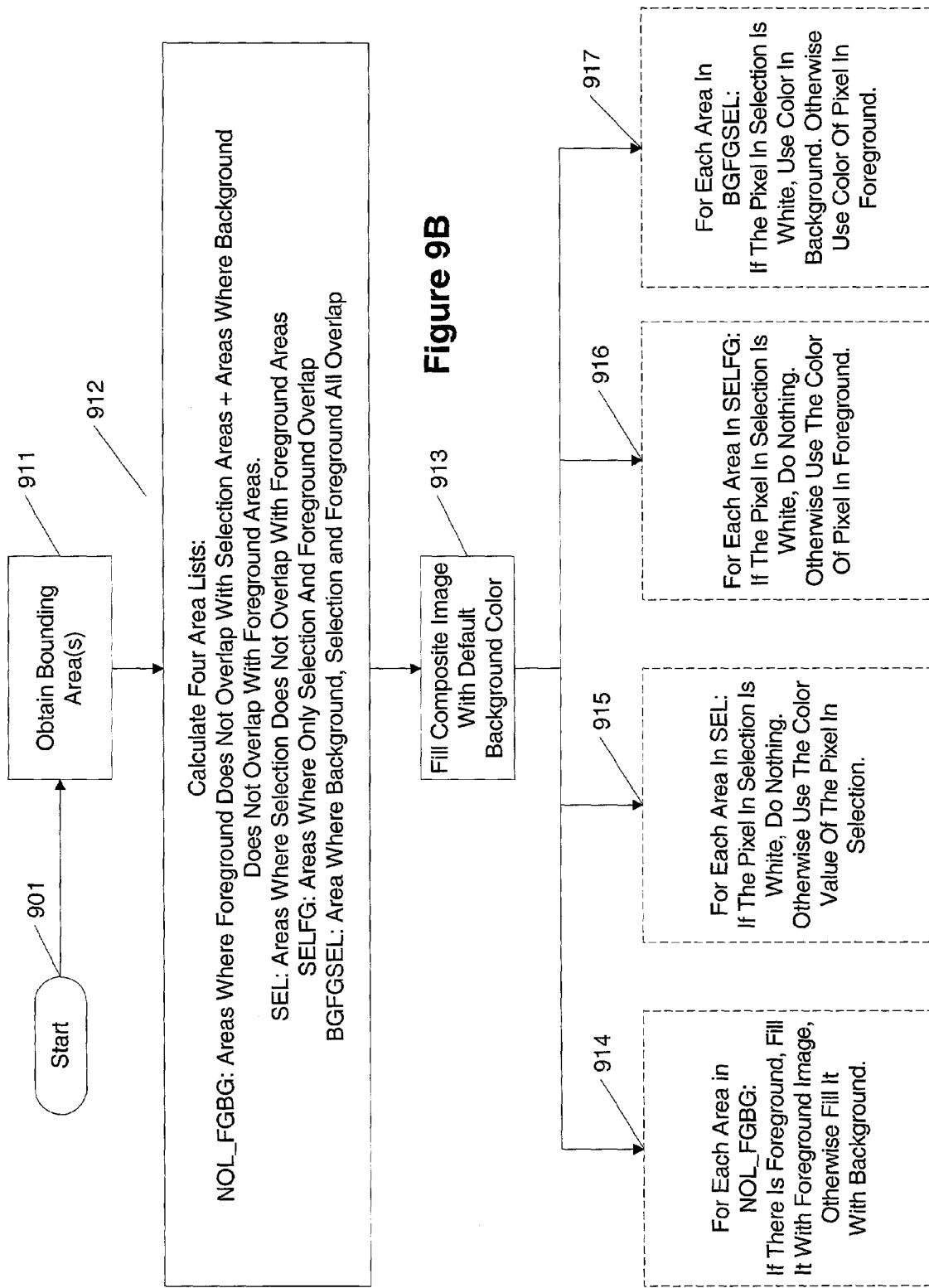

FIG. 9B shows a process for combining the multiple layers into a composite image. From the start in 901, the system obtains the bounding rectangles or other shapes for the content of the layers. Next, the system calculates four lists. The first list (NOL_FGBG) represents areas in which the foreground does not overlap with the selection areas and areas where the background does not overlap with the foreground areas. The second list (SEL) represents areas where the selection does not overlap with the foreground areas. The third list (SELFG) represents areas where only the selection and foreground areas overlap. The fourth list (BGFGSEL) represents areas where the background, selection, and foreground layers all overlap.

Next, in step 913, the composite image is filled with a default background color. Each list is processed in steps 914–917. In step 914, each area in the first list (NOL_FGBG), when a foreground area is present, is filled with the foreground image. Otherwise, the area is filled with the background image.

In step 915, for each area in the second list (SEL), when the pixel in the selection layer is white, no modification of the composite image is made. Otherwise, the color value from the pixel in the selection layer is used.

In step 916, for each area in the third list (SELFG), when the pixel in the selection layer is white, no modification to the composite image is made. Otherwise, the color of the pixel in the foreground layer is used.

In step 917, for each area in the fourth list (BGFGSEL), if the pixel in the selection layer is white, the color of the background is used. Otherwise, the color of the pixel in the foreground is used.

Figure 10:
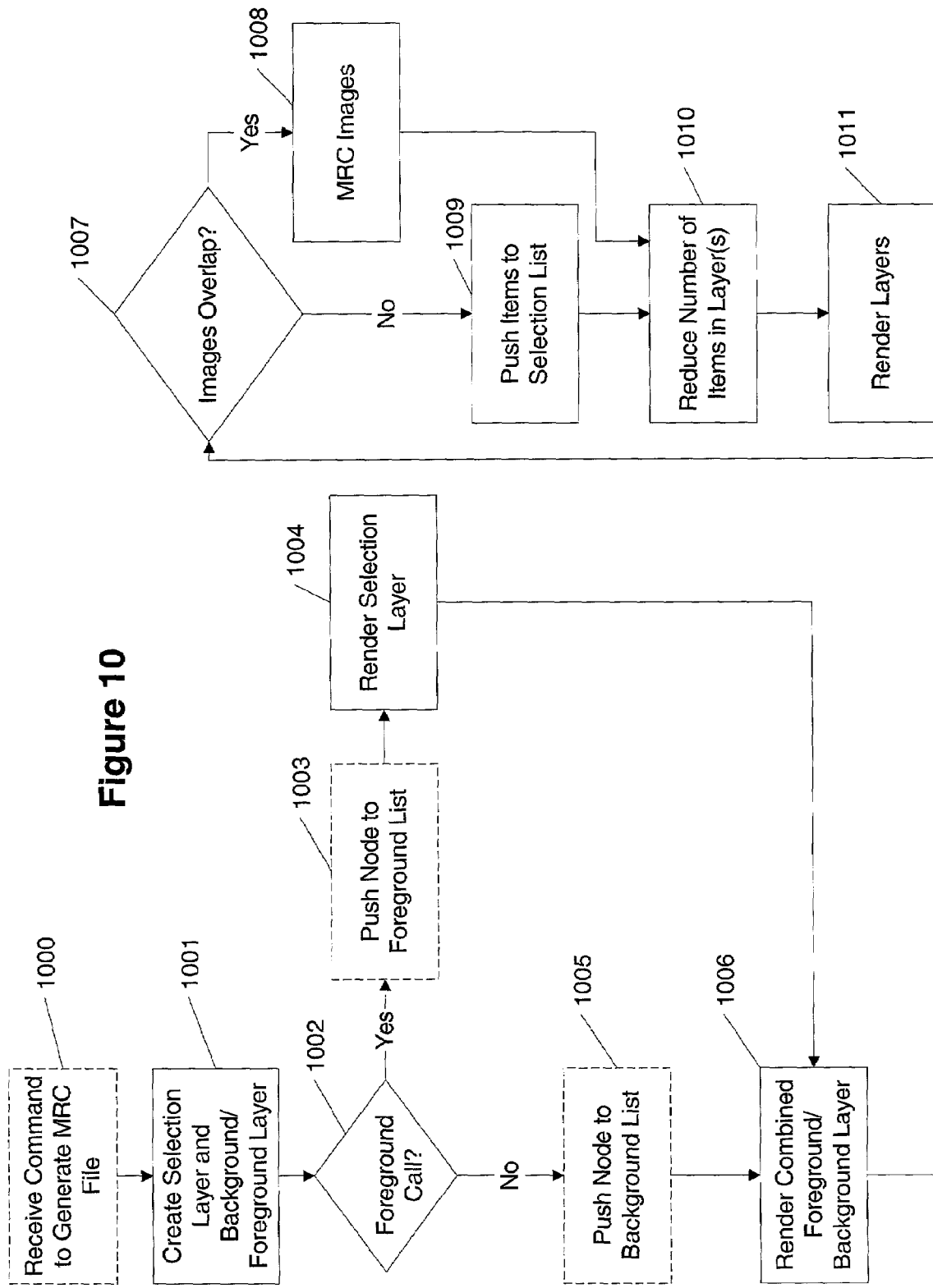
FIG. 10 shows another exemplary process of creating a mixed raster content file in accordance with aspects of the present invention.

FIG. 10 shows another exemplary process of creating a mixed raster content file. The process as shown in FIG. 10 produces the MRC file of FIG. 6. The process begins in step 1001 where the process is initiated. In one example, step 1000 may be the receipt of a command to print the MRC file. As step 1000 may be part of an application, part of a graphics toolbox as called by an application, or may be a host of other ways of initiating the creating of the MRC file, step 1000 is shown in a broken box.

For purposes of simplicity, the following is described in association with creating MRC files in a print driver. The following includes reference to the GDI API, available in the WINDOWS® operating system available from Microsoft Corporation, which exposes various calls for image manipulation. It is appreciated that operating systems including LINUX and Apple-based systems will have variations on the various calls. Accordingly, as all operating systems and print drivers are intended to be encompassed by the scope of this disclosure, the reference to GDI calls is intended to be non-limiting and is for explanatory purposes only.

To construct a print driver using GDI, a number of calls may be used. The following describes a number of calls that help separate content into various layers. The calls may be described generally as DrvXXX GDI APIs. Specifically, they include:

DrvCopyBits
DrvBitBlt
DrvStretchBlt
DrvStrokePath
DrvFillPath
DrvStrokeAndFillPath
DrvLineTo
DrvTextOut
DrvAlphaBlend
DrvGradientFill
DrvPlgBlt
DrvStretchBltROP
DrvTransparentBlt These calls are separated into foreground-generating methods and background-generating methods as follows:

Foreground-generating methods
    DrvStrokePath
    DrvLineTo
    DrvTextOut
    DrvBitBlt Background-generating methods
    DrvCopyBits
    DrvBitBlt
    DrvStretchBlt DrvAlphaBlend
DrvGradientFill
DrvPlgBlt
DrvStretchBltROP
DrvTransparentBlt
DrvFillPath
DrvStrokeAndFillPath It is appreciated that graphics renders change over time. Accordingly, the above list is given by way of example. It is appreciated that other calls may be used or will become known to those of ordinary skill in the art and are considered within the scope of graphics calls set forth above.

The printing process may be separated into two stages for the purposes of explanation. These two stages are represented by the left and right halves of FIG. 10. During the first stage, two bitmap buffers are created in step 1001. The two bitmaps are the selection layer and a combination background/foreground layer. The combination layer may be referred to as BGFG_SURFACE and the selection layer referred to as SEL_SURFACE. Both bitmaps cover the entire page. In step 1002, the system determines if one of the calls received was a foreground-generating DrvXXX call. Alternatively, FillPath and StrokeandFillPath calls, as opposed to BitBlt calls, may be used when a brush is a solid color and using various raster operations. If yes, then in step 1004, it renders on both BGFG_SURFACE and SEL_SURFACE by using a corresponding EngXXX call (as part of the GDI API) on BGFG_SURFACE and SEL_SURFACE separately. If the call was a background-generating DrvXXX call, (represented as "no" from decision step 1002), it renders on BGFG_SURFACE using corresponding EngXXX call from the GDI toolbox in step 1006.

Also, for each DrvXXX call, a data node is created that contains at least some of the following information:
Bounding rectangle or area that may be affected by the DrvXXX call,
Color value of the text for DrvTextOut call and for line drawings.
ID to identify type of DrvXXX call.

In addition, each node is added to a background elements list (BGE_LIST) or a foreground elements list (FGE_LIST) for processing in the second stage. Process steps 1003 and 1005 show the node may be pushed into each list. However, as the locations of these steps may occur before or after steps 1004 and 1006, steps 1003 and 1005 are shown in broken boxes.

BGFG_SURFACE may be the same resolution as the highest resolution to be used for background and foreground images. Alternatively, the resolution of the BGFG_SURFACE may be set to the same resolution as the page resolution as in the final image.

The second stage starts after all DrvXXX calls are processed. At this stage, images for the three layers are generated. In step 1007, the process determines whether the images in the background/foreground list overlap. If yes, then the images are added to the images to be combined by the MRC process (or processes) in step 1008. If the images do not overlap, the process attempts to push the images to the selection list in step 1009. To determine where selection image is needed, an intersecting test is performed for each image in the BGE_LIST with every image in FGE_LIST. All areas (rectangular or otherwise) where foreground elements and background elements intersect are addressed by a selection image.

In one embodiment, the process attempts to place as much of the images in the selection layer as possible into the foreground layer. In another embodiment, the process attempts to keep the sum of areas of all images at a minimum to reduce compression size and increase performance at compress, decompress and rendering stages. In a further embodiment, the process attempts to try to have the fewest numbers of total images in all layers. These embodiments may be combined or used separately. They are described together for purposes of explanation.

In step 1010, the process attempts to reduce the number of items or images per layer. For example, two non-overlapping text images of the same color may be combined.

In step 1010, the process attempts to reduce the number of elements in the layers. Here, elements of the same layer are combined together to make larger elements into large ones. It should be noted this step might introduce new items in the lists. The following lists various approaches for combining the elements. One or more may be used to determine how to group elements of the layers:

The combined element should avoid creating new overlaps with elements in other layers, unless the doing so brings benefits in other aspects listed below;

The area of combined element should not be much bigger than the sum of individual elements. A threshold may be set (for example, 30%–40%) and compared against to determine when combined elements are getting too big; and Rendering-specific calls may have qualifiers (for example, foreground elements created by DrvTextOut should not be combined with elements created by other DrvXXX calls because they have different BPP values. Also, within foreground elements created by DrvTextOut, only elements with the same color can be combined).

After determining how to decompose the page, three lists exist:
BGE_LIST;
SLE_LIST; and,
FGE_LIST.

Each list contains a list of nodes that describe the area (e.g., rectangle or other shape) to crop from the page. In a further embodiment, the lists may include a scale factor describing how the image in the list will be scaled on the final image. The scale factor permits the ability to store each element image at a different resolution, even within the same layer.

Finally, the various layers are rendered in step 1011. For each element in the background element list that does not intersect with selection images, an image may be formed by cropping an area from BGFG_SURFACE and placing t in the background layer. For each element in the foreground element list that does not intersect with selection images, an image may be formed by cropping an area from SEL_SURFACE and adding it to the foreground layer. For elements in background and foreground lists that intersect with selection images, images are created for each layer by using both SEL_SURFACE and BGFG_SURFACE.

For example, also referring to that intersection/pixel-by-pixel comparison option of FIG. 9B, for a background element that intersects with the selection image, the background image may be constructed by cropping an area from BGFG_SURFACE. Next, for each pixel in the background image, the process checks the corresponding pixel in SEL_SURFACE. If the pixel in SEL_SURFACE is black, the pixel value in the background image is replaced with a nearby background pixel whose corresponding pixel in SEL_SURFACE is white. For a foreground element that intersects with the selection image, the foreground image may be constructed by cropping an area from BGFG_SUR- FACE. Next, for each pixel in the foreground image, the process checks the corresponding pixel in SEL_SURFACE. If the pixel in SEL_SURFACE is white, the pixel value in the background image is replaced with a nearby foreground pixel whose corresponding pixel in SEL_SURFACE is black. One advantage to pushing images to the selector layer and/or reducing the number of images per layer is that the resulting layers may be compressed with higher efficiency.

As mentioned above, various compression techniques may be used to compress the various images. For example, for each image that is 1 bpp, one may compress it using G4 compression. For each image that is 24 bpp, one may compress it using JPEG compression as known in the art.

Figure 11:
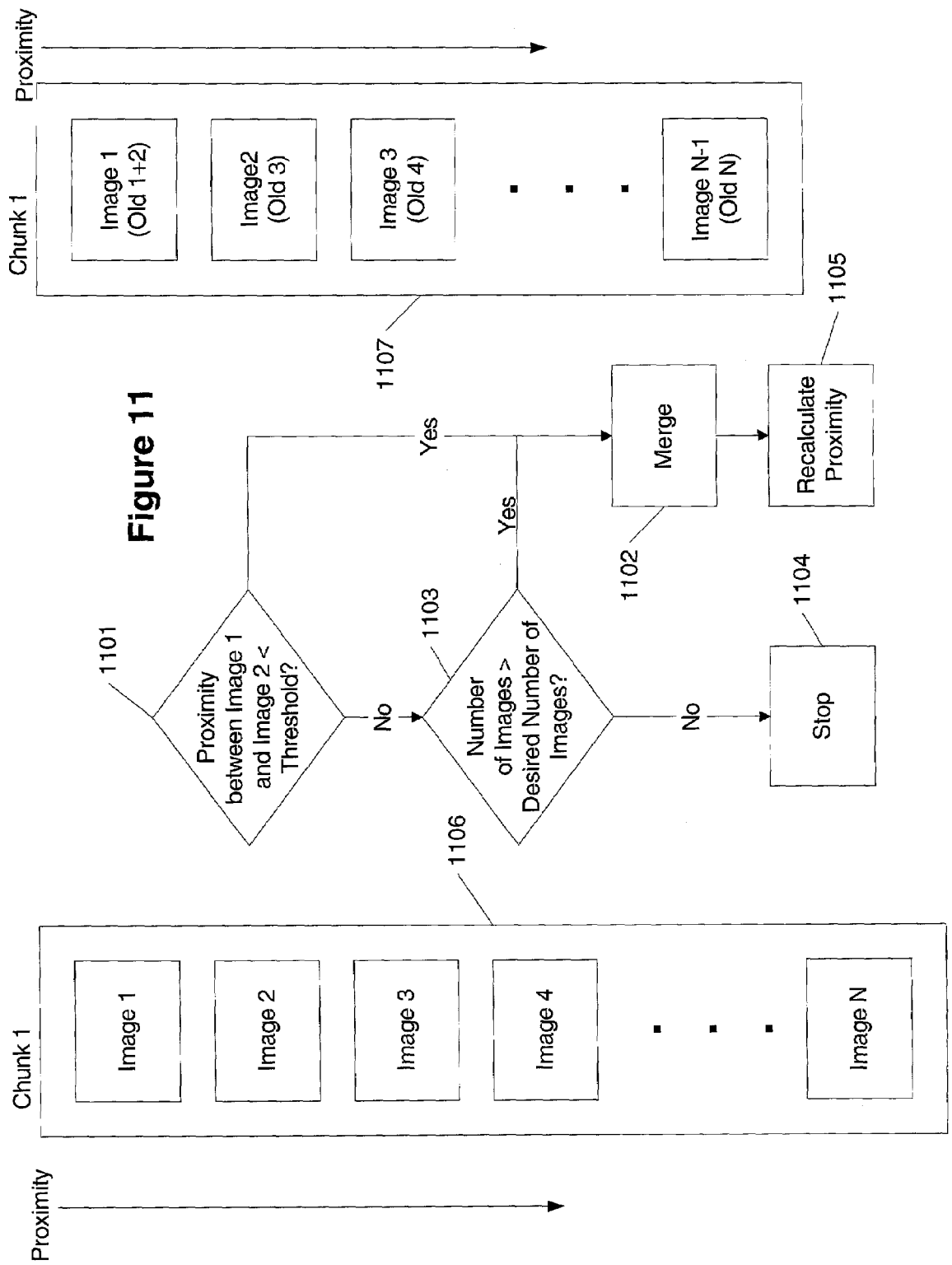
FIG. 11 shows an exemplary process for merging images in accordance with aspects of the present invention.

FIG. 11 shows a process for merging images. Images may be processed all together or may be separated into groups (referred to herein as "chunks"). The images in the chunks may be grouped by image type. Alternatively, the chunks may be grouped by the order in which they were created. The chunks may have a predetermined maximum number of images or may not.

In FIG. 11, chunk 1 has N images. The images are arranged in order of proximity to each other. Proximity is described below in relation to FIG. 13. Proximity may be viewed as the physical distance between the images or may be the closeness of the images to each other for merging purposes. If two images overlap, their proximity value is "0", meaning they have the lowest proximity value and should be merged. Images that should not be merged may be set to have a proximity value of 1 or more. It is appreciated that any proximity scale may be used.

All images in chunk 1 are compared against each other and each pair of images is ranked in terms of proximity value. If N=5 in FIG. 11, the pairs of images would be as follows:

Image 1, Image 2
Image 1, Image 3
Image 1, Image 4
Image 1, Image 5
Image 2, Image 3
Image 2, Image 4
Image 2, Image 5
Image 3, Image 4
Image 3, Image 5
Image 4, Image 5

The proximity for each pair is determined and the pairs ordered as shown in FIG. 11 for chunk 1 on the left side of the Figure.

In step 1101, for the first pair of images, the process determines if the threshold is less than a predetermined threshold. If yes, then the images are merged in step 1102 and the proximity recalculated for the remaining images. If the proximity from step 1101 is higher than the threshold, then the merging may stop in step 1104. For example, the threshold may be set to any value between the low proximity value (meaning the images should be merged) and the high proximity value (meaning the images should not be merged). The range for the threshold may be 0.4–0.6. It is noted that the threshold value may be higher or lower than the above range depending on the types of images, the ratios of the types of images and other factors.

As set forth above, the process attempts to merge images together that are proximate to each other. Another advantage may be achieved in minimizing the number of resulting images the MRC operation needs to process. In this case, even though the images may not have a proximity below the threshold used in 1101, a desired number of images per chunk may be specified in order to minimize the number of images needing to be processed. Step 1103 represents a determination of whether the number of images in the chunk is less than the desired number of images in the chunk. For example, the desired number of images may be 4. So, even though the proximity value between any two of the images may be high, the images may still be merged (step 1102) to reduce the number of resultant images and the proximity of the resulting image pairs recalculated in step 1105.

Figure 12:
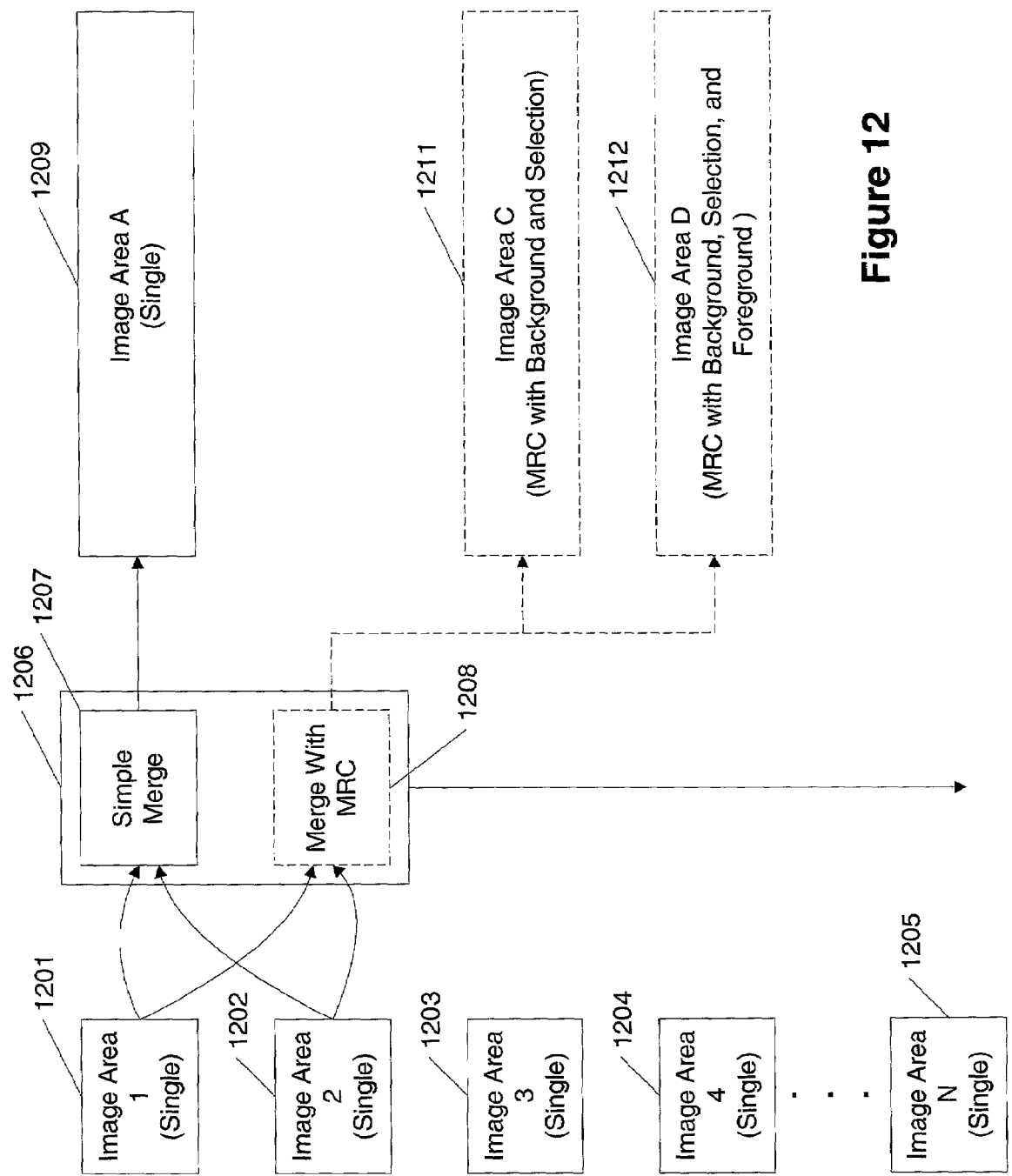
FIG. 12 shows various outcomes for merging images in accordance with aspects of the present invention.

FIG. 12 shows an example of the merging function stepping through pairs of images and the resulting images. The single images are represented by image areas 1-N 1201–1205 respectively. The merging process 1206 moves among the images 1201–1205. The merging of any two images may be a simple merge process (process 1207) in which the resulting image (image area A 1209, which is a single image and is treated as a background image) does not result in any MRC images. Alternatively, the resulting merge may be a complex merge with MRC as shown in process 1208. There are at least two types of merge results from the MRC merge 1208. The first 1211 is image area C in which background and selection layers are produced. The second 1212 is image area D in which background, selection, and foreground layers are produced. This ordering of single (background) image, MRC with background and selection, and MRC with background, selection, and foreground layers is also the preference for determining which merge to perform. That is, one would rather produce an MRC file with a single background layer than an MRC file with background, selection, and foreground layers.

Figure 13:
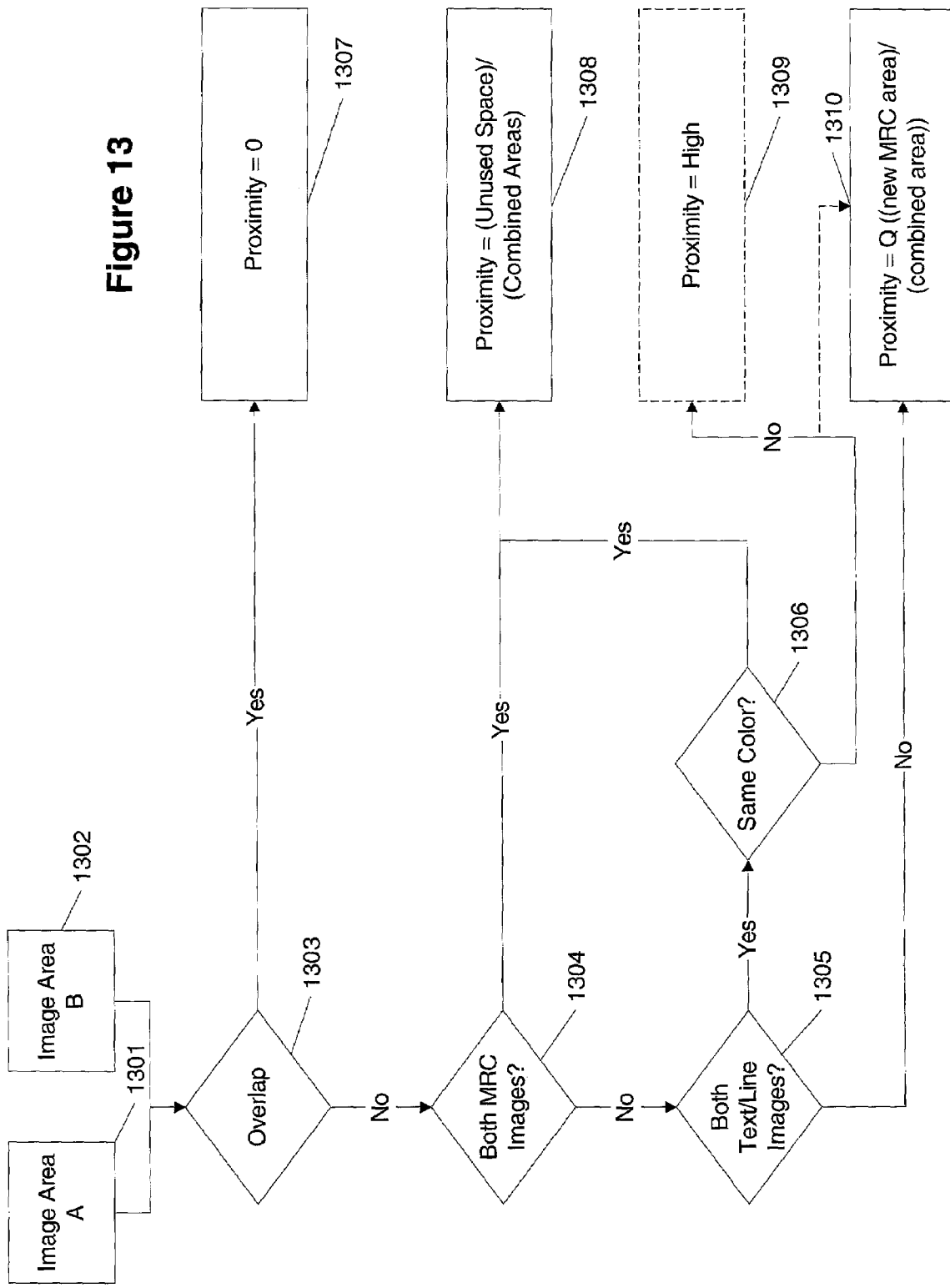
FIG. 13 shows an exemplary process for setting proximity between images in accordance with aspects of the present invention.

FIG. 13 shows a process for determining proximity for any two image areas. Two image areas A 1301 and B 1302 are checked for overlap in step 1303. If the images overlap, then the proximity is set to 0 in step 1307. If not, the process determines if both images are currently MRC images in step 1304. If both images are MRC images, then the proximity of the images is set (step 1308) to a value between 0 and a high value (here, the high value being 1). This intermediate value may be a fixed value for all situations (e.g., 0.5). Alternatively, the value may be set as a ratio. In one example, the ratio may be the ratio of efficiency of combining the image areas. In other words, the ratio may be the unused space of the merged image divided by the total area of the combined images. This ratio is shown by equation in step 1308.

Figure 14:
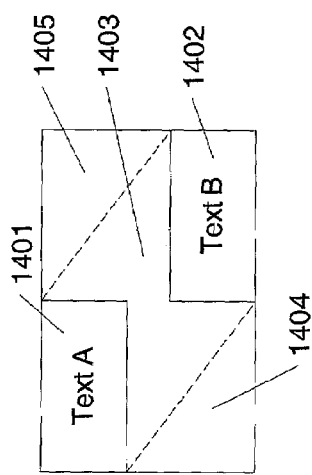
FIG. 14 shows two images and various representations of space consumed by their merger in accordance with aspects of the present invention.

FIG. 14 shows an example of determining the unused space. In FIG. 14, text image A 1401 is being considered for combination with text image B 1402. In this example, the bounding areas of 1401 and 1402 are shown by rectangles. The combined image area of the two areas 1401 and 1402 results in unused space 1403 shown bounded by dotted lines. In an alternate embodiment, the unused space may be based on a rectangular grid, resulting in the total area including 1401, 1402, area enclosed by the dotted lines 1403 and outlying areas 1404 and 1405. In the first example, the unused space includes area 1403. In the second example the unused space includes the unused area 1403, 1404, and 1405.

Referring back to FIG. 13, if both images are not currently MRC images, then the process determines if both images are text/line images in step 1305. If yes, and the images are the same color (step 1306), the proximity is set in step 1308 as described above.

If the text/line images are not the same color, MRC needs to be used so the proximity is set high (e.g. 1) as shown in step 1309. Alternatively, the proximity may be set high as shown in step 1310 in which the proximity is set to a coefficient times the new MRC area generated by the merger of the two images divided by the total area of the combined images.

If the outcome of step 1305 is no, then the proximity is set in step 1310. Alternatively, one may set the proximity as in step 1309.

Figure 15A:
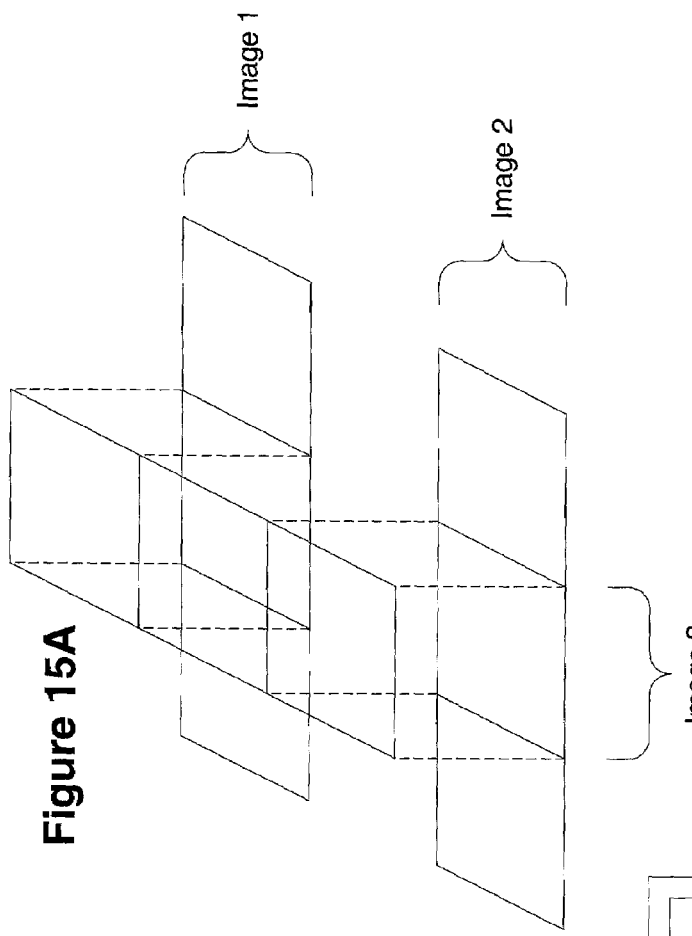
FIGS. 15A, 15B, and 15C show various representations of counting consumed space in combined images in accordance with aspects of the present invention.
Figure 15B:
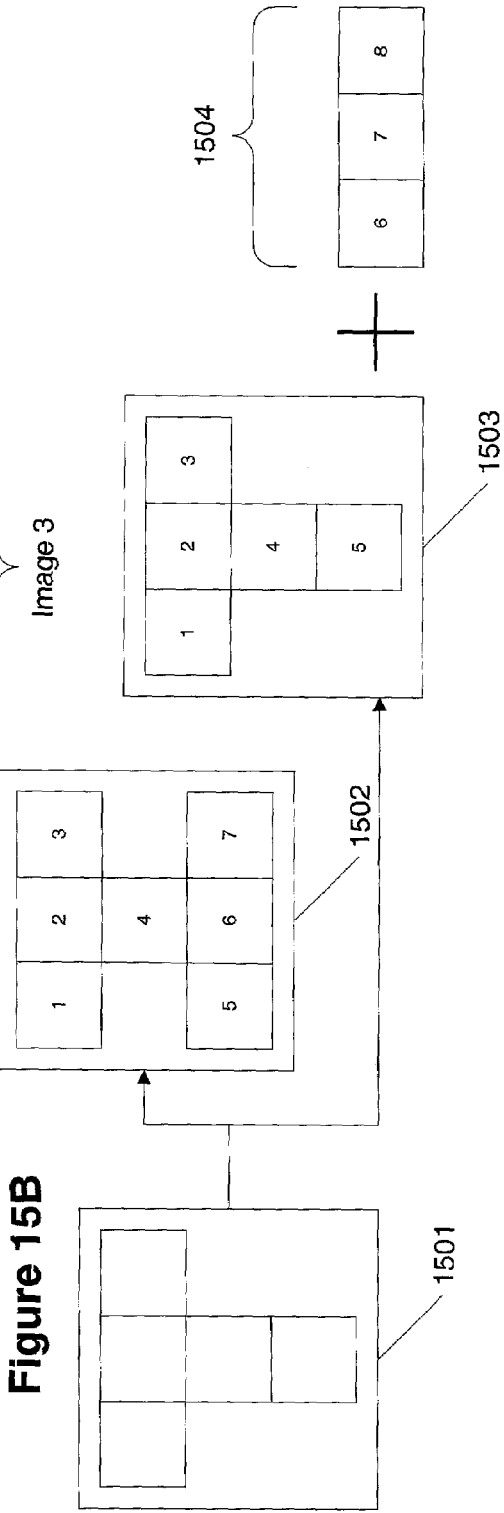

Once the merged files are created, the amount of space consumed by the original images in the combined images may be remembered. There are different ways of counting the space for merged images. FIG. 15A shows three images (1–3) in which each is three units in size. It is appreciated that any designation of space may be used including square centimeters, square millimeters, square inches, pixels and the like. Image 1 overlaps with image 3 and image 2 overlaps with image 3. In FIG. 15B, 1501 shows the combination of images 1 and 2. After the merger of the combined image 1+3 with image 2, the resultant combination is represented as 1502. In 1502, the number of actually used units is 7. However, this number may be approximated by taking the combination of images 1 and 3 (1503) and adding the size of image 2 1504 resulting in the approximate size of 8 units.

Figure 15C:
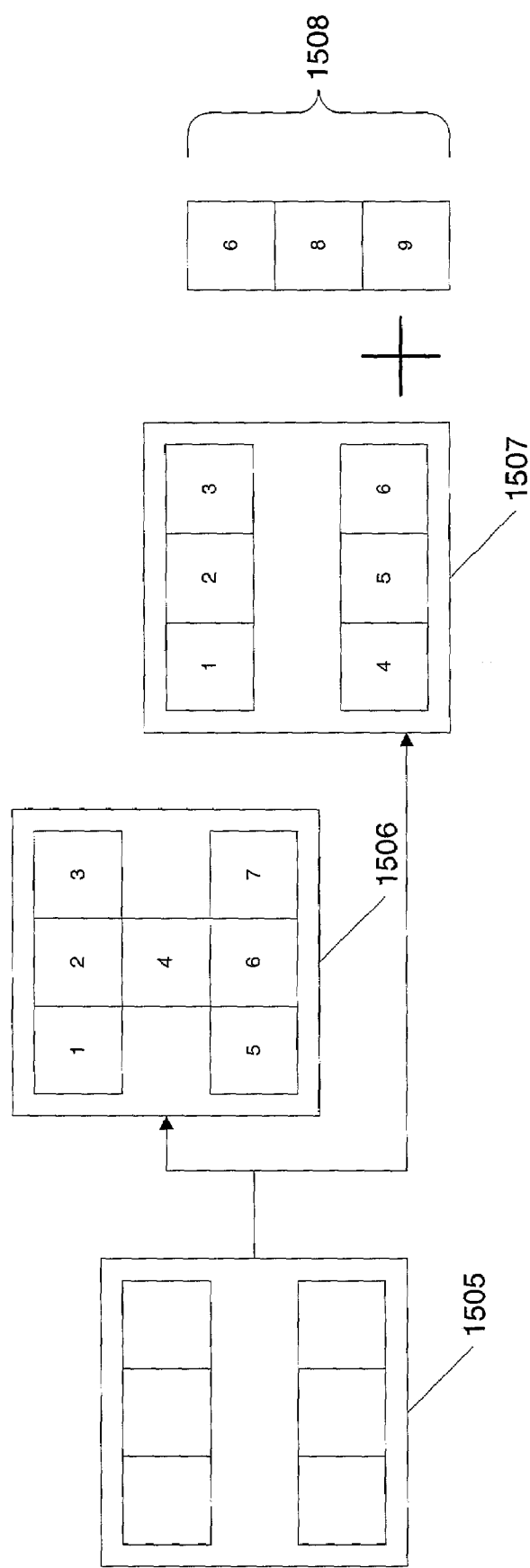

FIG. 15C shows yet another representation. Here, images 1 and 2 are combined first resulting in image 1505. Adding image 3 results in image 1506, again being 7 units in size as the center unit of image 2 and the bottom unit of image 3 are not counted separately but combined. Alternatively, this value of the size of the used space in the combined image may include 1507 of images 1 and 2 with image 3 1508, yielding a total of 9 units. In yet a further embodiment, the size of the merged image may be capped at the total size of the combined image.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments. Although the invention has been defined using the appended claims, these claims are exemplary in that the invention is intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It is intended that the written description of the invention contained herein covers all such modifications and alterations.

We claim:

1. A computer-readable medium having a program stored thereon, said program able to form a mixed raster content (MRC) image, said program comprising the steps of:
   receiving a command to generate an image file from an application as an MRC image;
   generating said MRC image through the use of a print driver;
   generating a selection layer;
   rendering a combined foreground/background layer;
   processing contents of said file to generated lists of items, said lists including a list of items for a foreground layer and a list of items for a background layer;
   processing said lists; and
   generating a background layer and foreground layer including each respective item in the background layer list and foreground layer list that does not intersect with an item in the selection layer list.

2. A computer-readable medium having a program stored thereon, said program rendering a mixed raster content file to a composite image, said program comprising the following steps:
   determining that a pixel in the mixed raster content file is in a selector layer; determining that said pixel is not white;
   determining if said pixel is in a foreground layer; and
   using a color of said pixel from said foreground layer to paint a corresponding pixel in said composite image when determining that said pixel is in said foreground layer; and
   using a color of said pixel from the selector layer to paint a corresponding pixel in the composite image when determining that said pixel is not in the foreground layer.

3. A method of forming a mixed raster content (MRC) image comprising the steps of:
   receiving a command to generate an image file from an application as an MRC image;
   generating said MRC image through the use of a print driver;
   generating a selection layer;
   generating a combined foreground/background layer;
   generating lists of items, said lists including a list of items for a foreground layer and a background layer and a selection layer;
   processing said lists; and
   generating a background layer and a foreground layer including each respective item in the background layer list and foreground layer list that does not intersect with an item in the selection layer list.

4. A computer-readable medium having a program stored thereon, said program rendering a mixed raster content file to a composite image, said program comprising the steps of:
   determining that a pixel in the mixed raster content file is not in said selector layer;
   determining if a corresponding pixel exists_in said foreground layer; and
   using a color of said corresponding pixel from said foreground layer to paint a corresponding pixel in said composite image when determining that said corresponding pixel exists in said foreground layer;
   determining if a corresponding pixel exists in a background layer when determining that the corresponding pixel does not exist in the foreground layer;
   using a color of the corresponding pixel in the background layer to paint a corresponding pixel in the composite image when determining that the corresponding pixel exists in the background layer; and
   using a default background color to paint a corresponding pixel in the composite image when determining that corresponding pixel does not exist in the background layer.

5. A process for rendering a mixed raster content file to a composite image comprising the steps of:
   determining that pixel in the mixed raster content file is in a selector layer;
   determining that said pixel is not white;

determining if said pixel is in a foreground layer;

using a color of said pixel from said foreground layer to paint a corresponding pixel in said composite image when determining that said pixel is in said foreground layer; and using a color of said pixel from the selector layer to paint a corresponding pixel in the composite image when determining that said pixel is not in the foreground layer.

6. A process for rendering a mixed raster content file to a composite image comprising the steps of:

determining that a pixel in the mixed raster content file is not in a selector layer;

determining if a corresponding pixel exists in a foreground layer;

using a color of said corresponding pixel from said foreground layer to paint a corresponding pixel in said composite image when determining that said corresponding pixel exists in said foreground layer;

determining if a corresponding pixel exists in a background layer when determining that that the corresponding pixel does not exist in the foreground layer;

using a color of the corresponding pixel in the background layer to paint a corresponding pixel in the composite image when determining that the corresponding pixel exists in the background layer; and using a default background color to paint a corresponding pixel in the composite image when determining that corresponding pixel does not exist in the background layer.

7. A process for rendering images comprising the steps of:

determining a bounding area for each image;

generating at least first and second lists in which said first list reflects those areas with no overlap between images and said second list reflects those areas with overlap;

rendering the non-overlapping areas by each area;

rendering the overlapping areas on a pixel by pixel basis.

8. A computer-readable medium, said medium having stored thereon a mixed raster content data structure configured to be rendered as a composite image, said mixed raster content data structure comprising:

a background layer;

a foreground layer; and a selector layer, wherein said selector layer includes an image having a bounding rectangle smaller than a size of said composite image.

9. A computer-readable medium, said medium having stored thereon a mixed raster content data structure comprising:

a background layer;

a foreground layer; and a selector layer, wherein said foreground layer includes two or more images having different color depths with color palettes.

10. A process for rendering composite images comprising the steps of:

determining a bounding area for each image;

generating four lists in which said first list reflects those areas with no overlap between images, in which said second list reflects those areas where selection layer areas do not overlap with foreground layer areas, in which said third list reflects those areas where only selection and foreground layer areas overlap, and in which said fourth list reflects those areas where background, selection, and foreground layer areas overlap.

11. The process according to claim 10, further comprising the steps of:

filling said composite image with said foreground layer areas from said first list when said foreground layer areas are present in said first list, otherwise filling said composite image with background layer areas.

12. The process according to claim 10, further comprising the step of:

filling said composite image with said selection layer area from said second list when said second list contains a non-white selection layer area.

13. The process according to claim 10, further comprising the step of:

filling said composite image with said selection layer area from said third list when said third list contains a non-white selection layer area, otherwise filling said composite image with said foreground layer area.

14. The process according to claim 10, further comprising the step of:

filling said composite image with said foreground layer area when said selection layer area is non-white, otherwise filling said composite image with said background layer area.

* * * * *